United States Patent
Rangan et al.

(10) Patent No.: US 7,313,813 B2
(45) Date of Patent: *Dec. 25, 2007

(54) METHOD AND APPARATUS FOR PROVIDING AND MAINTAINING A USER-INTERACTIVE PORTAL SYSTEM ACCESSIBLE VIA INTERNET OR OTHER SWITCHED-PACKET-NETWORK

(75) Inventors: P. Venkat Rangan, San Diego, CA (US); Sam Inala, Redmond, WA (US)

(73) Assignee: Yodlee.com, Inc., Redwood City, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/619,375

(22) Filed: Jul. 11, 2003

(65) Prior Publication Data

US 2004/0107269 A1 Jun. 3, 2004

Related U.S. Application Data

(63) Continuation of application No. 10/180,146, filed on Jun. 25, 2002, now Pat. No. 6,594,766, which is a continuation of application No. 09/208,740, filed on Dec. 8, 1998, now Pat. No. 6,412,073.

(51) Int. Cl.
*H04L 29/00* (2006.01)
(52) U.S. Cl. ...................................... 726/5
(58) Field of Classification Search ............ 726/8, 726/12, 15, 6, 5
See application file for complete search history.

(56) References Cited

U.S. PATENT DOCUMENTS 5,675,507 A * 10/1997 Bobo, II ............... 709/206
6,006,265 A * 12/1999 Rangan et al. ........... 709/226
6,170,011 B1 * 1/2001 Macleod Beck et al. ... 709/224
6,199,077 B1 * 3/2001 Inala et al. ............ 715/501.1
6,212,178 B1 * 4/2001 Beck et al. ............ 370/352
6,412,073 B1 * 6/2002 Rangan .................. 726/5

(Continued)

OTHER PUBLICATIONS

U.S. Appl. No. 10/180,146, P. Venkat Rangan.

*Primary Examiner*—Matthew B Smithers
(74) *Attorney, Agent, or Firm*—Donald R. Boys; Central Coast Patent Agency, Inc.

(57) ABSTRACT

An Internet Portal is enabled by software executing on an Internet-connected server. The Portal, in response to a log-on by a user, presents a secure and personalized page for and to the user, the personalized page having listed plural Internet destinations enabled by hyperlinks, wherein upon invocation of a hyperlink by the subscriber, such as by a point-and-click technique, the portal invokes a URL for the destination, and upon connection with the destination, transparently provides any required log-on information for user access at the destination. In an enhanced embodiment a search function is provided wherein a user may configure searches in any or all of the listed destinations on a personalized page. Provision is provided for log-on by limited appliances, such as by a Smartcard or embedded password, and in some embodiments functionality is provided in a browser plug-in wherein a user may navigate to a site, and, in response to a request for log-in data, the subscriber may use a hot key or pointer input, which will cause the browser to access and provide the needed data from the Password-All source.

39 Claims, 3 Drawing Sheets

U.S. PATENT DOCUMENTS

| | | |
|---|---|---|
| 6,594,766 B2 * | 7/2003 | Rangan et al. .................. 726/8 |
| 6,874,119 B2 * | 3/2005 | Macleod Beck et al. 715/500.1 |
| 7,039,857 B2 * | 5/2006 | Beck et al. .............. 715/500.1 |
| 2002/0091726 A1 * | 7/2002 | Macleod Beck et al. 707/501.1 |

* cited by examiner

METHOD AND APPARATUS FOR PROVIDING AND MAINTAINING A USER-INTERACTIVE PORTAL SYSTEM ACCESSIBLE VIA INTERNET OR OTHER SWITCHED-PACKET-NETWORK

CROSS-REFERENCE TO RELATED DOCUMENTS

The present application is a continuation application of application Ser. No. 10/180,146, filed Jun. 25, 2002 now U.S. Pat. No. 6,594,766, which is a continuation of U.S. application Ser. No. 09/208,740, filed Dec. 8, 1998, which issued as U.S. Pat. No. 6,412,073 on Jun. 25, 2002, and which is incorporated herein in its entirety.

FIELD OF THE INVENTION

The present invention is in the field of Internet navigation and browsing, and pertains more particularly to methods and apparatus for providing and maintaining an Internet portal configured to provide access to an interaction with other Internet information sources.

BACKGROUND OF THE INVENTION

The information network known as the world wide web (WWW), which is a subset of the well-known Internet, is arguably the most complete source of publicly-accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

What is clearly needed is an interactive Internet portal that will enable users to store their WEB pages, user names, and passwords, and that can accomplish pre-defined tasks such as navigation and interaction between WEB servers based on user pre-programming (user profiles). Such a system would greatly simplify on-line or network-based business transactions.

SUMMARY OF THE INVENTION

In a preferred embodiment of the present invention an Internet Portal is provided, comprising an Internet-connected server; and a portal software executing on the server. The portal, in response to a log-on by a user, presents a secure and personalized page for the user, the personalized page having a list of Internet destinations enabled by hyperlinks, wherein, upon invocation of a hyperlink by the subscriber, the portal invokes a URL for the destination, and upon connection with the destination, transparently provides any required log-on information required for user access at the destination.

The Portal server can be a part of an Internet server used for another purpose, and may be hosted therefore by such as an Internet service provider (ISP).

In some embodiments search functions are provided, and in the same or other embodiments, after a user invokes a hyperlink, during navigation time to the invoked destination, the Portal software accesses and displays one or more informative displays to the user. Informative displays may be one or more advertisements. Further, in some embodiments periodic summaries may be provided for accounts associated with destinations on the user's WEB page.

In another aspect of the invention an Internet Portal is provided comprising an Internet-connected server; and a portal software executing on the server. In this aspect the portal interacts with a browser plug-in executing on a subscriber's computer station, such that, when the user invokes a destination from the browser, wherein the destination requires a secure log-on, the portal software cooperates with the browser plug-in to furnish the data necessary for a successful log-on transparent to the user. In this embodiment as well, after a user invokes a hyperlink, during navigation time to the invoked destination, the Portal software cooperates with the user's browser plug-in to access and display one or more informative displays to the user. The informative displays may be one or more advertisements. Further, in some embodiments periodic summaries may be provided for accounts associated with destinations on the user's WEB page.

In yet another aspect an Internet Portal application executable on an Internet-connected server is provided, comprising a log-on facility adapted for users to enter log-on information for access to the Portal application; and a plurality of stored personal pages associated each with one or more specific users. In this aspect individual personalized pages list plural Internet destinations enabled by hyperlinks, wherein upon invocation of a hyperlink by a user, the portal invokes a URL for the destination, and upon connection with the destination, transparently provides any required log-on information for user access at the destination. After transparent log-on to an invoked destination, the page at the destination is conveyed to and displayed for the user. The application may be adapted to execute on a server hosted by an Internet Service Provider (ISP) to which the users subscribe. There may also be a search function adapted to search selected ones of listed destinations in user's pages for defined search criteria.

In this aspect as well, after a user invokes a hyperlink, during navigation time to the invoked destination, the Portal software can access and display one or more informative displays to the user, which may be advertisements. Further, in some embodiments periodic summaries may be provided for accounts associated with destinations on the user's WEB page.

In yet another aspect an Internet Portal application executable on an Internet-connected server is provided, comprising a log-on facility adapted for users to enter log-on information for access to the Portal application; and a plurality of stored personal pages associated each with one or more specific users. The portal application interacts with a browser plug-in executing on a subscriber's computer station, such that, when the user invokes a destination from the browser, wherein the destination requires a secure log-on, the portal software cooperates with the browser plug-in to furnish the data necessary for a successful log-on transparent to the user.

In this embodiment as well as others, the application may be adapted to execute on a server hosted by an Internet Service Provider (ISP) to which the users subscribe. Also, as in some other embodiments, after a user invokes a hyperlink, during navigation time to the invoked destination, the Portal software, in cooperation with the browser plug-in, accesses and displays one or more informative displays to the user, which may be commercial advertisements. Further, in some embodiments periodic summaries may be provided for accounts associated with destinations on the user's WEB page.

In addition to the apparatus and software applications provided, several methods are taught in the following enabling disclosure as well. In the disclosure, for the first time, an invention is described that allows a subscriber to safely and securely navigate to any of multiple destinations on the Internet with a single point-and-click, and in the case of destinations requiring secure log on, the log on may be accomplished completely transparently to the user, while still maintaining strict security of the user's passwords and other security data.

BRIEF DESCRIPTION OF THE DRAWING FIGURES

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
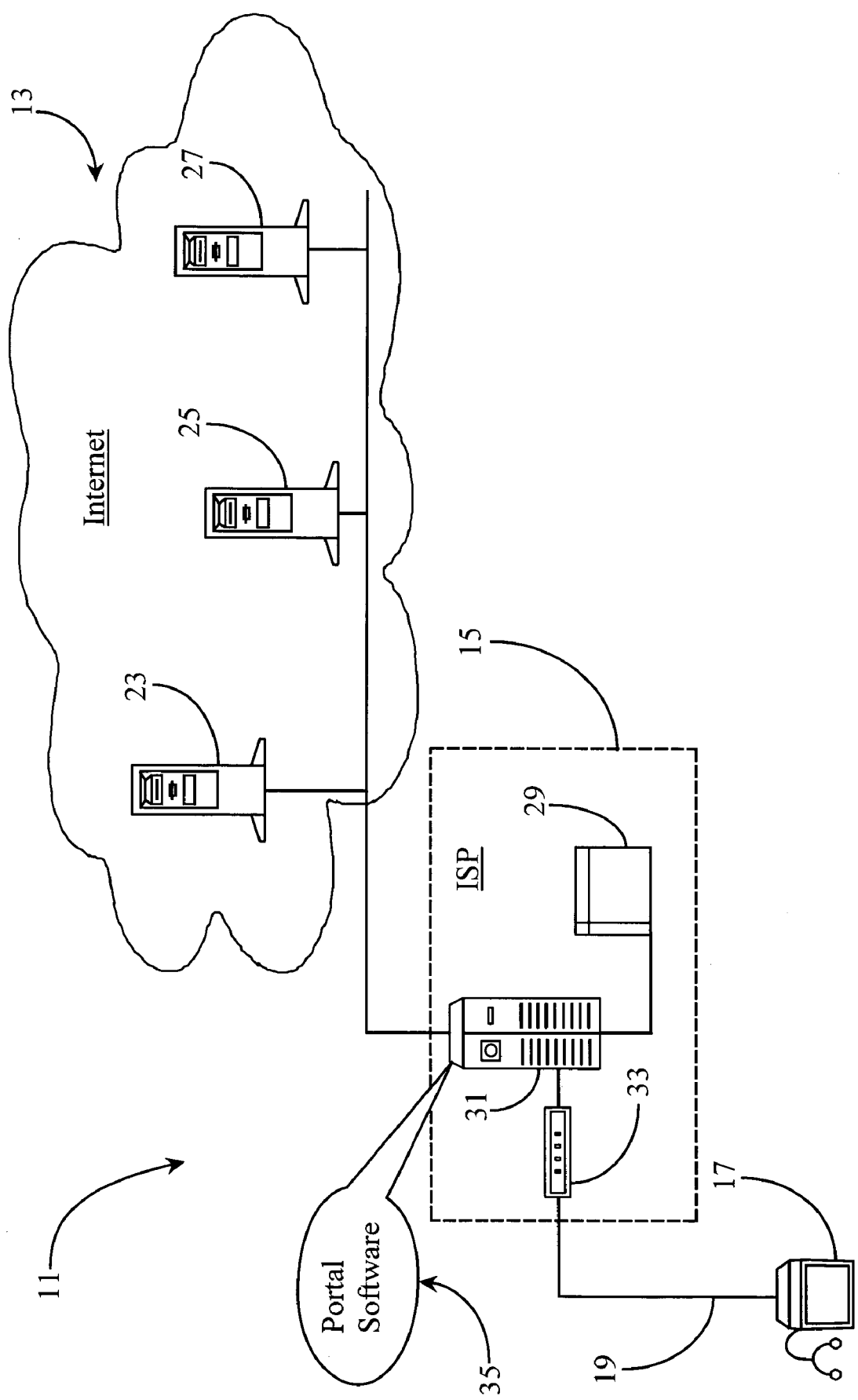
FIG. 1 is an overview of an Internet portal-system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well-known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
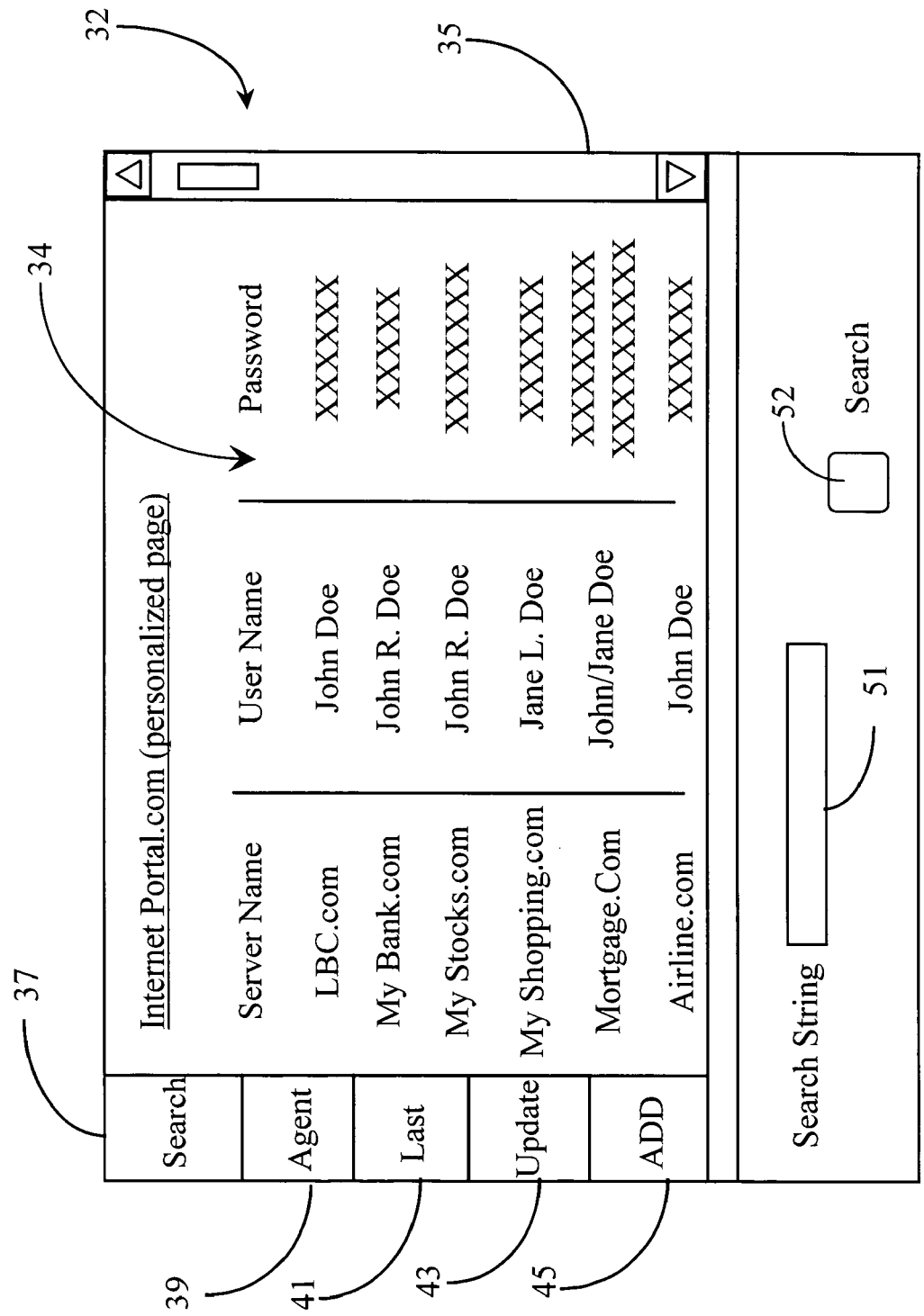
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but, given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a predetermined signal (right click, key stroke, etc.), and the Password-All suite will then enter a new passthrough in the user's Password-All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention a knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
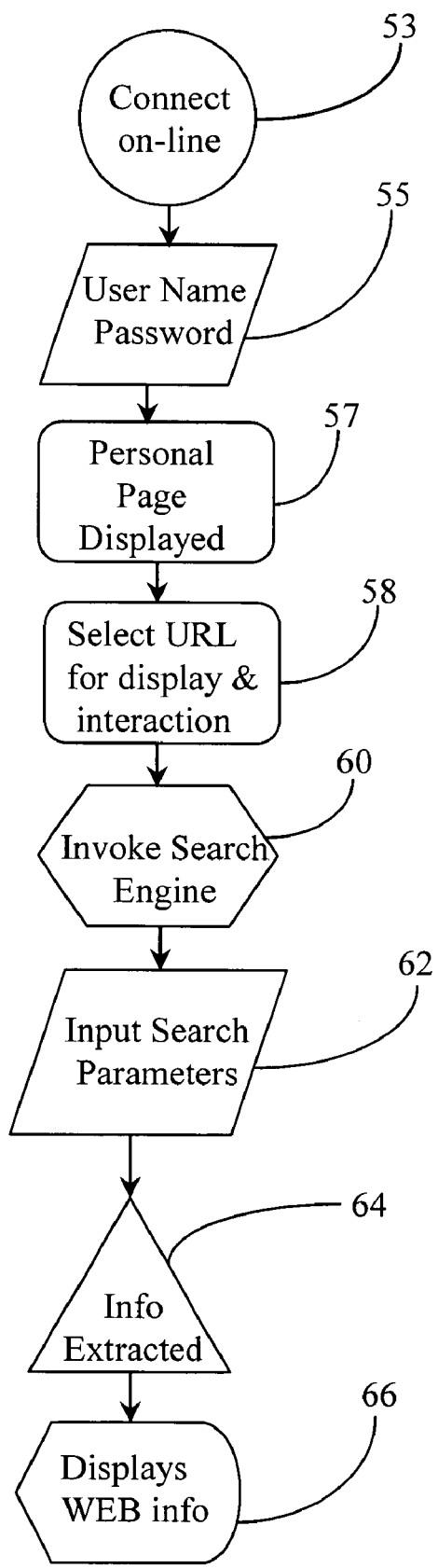
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 3.1. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

The method and apparatus of the present invention may be practiced via private individuals on the Internet, businesses operating on a WAN connected to the Internet, businesses operating via private WAN, and so on. There are many customizable situations.

The present invention as taught herein and above should be afforded the broadest of scope. The spirit and scope of the present invention is limited only by the claims that follow.

What is claimed is:

1. An Internet portal, comprising:
an Internet-connected server; and
a portal software executing on the server;
wherein the portal, by executing the software, in response to log-on by a user at client-side equipment, presents a secure and personalized page for the user, the personalized page having a list of Internet destinations pre-selected by the user, wherein, upon invocation of a destination by the user, the portal invokes a URL for the destination, and upon connection with the destination, transparently provides any required log-on information required for user access at the destination.

2. The Internet Portal of claim 1 wherein required log-on information includes a password accessible to the server, and the password is provided to the destination for log-on.

3. The Internet Portal of claim 1 wherein the user connects to the Portal through an Internet Service Provider (ISP), and after transparent log-on to an invoked destination, the page at the destination is conveyed to and displayed for the user.

4. The Internet Portal of claim 1 wherein the Portal is hosted by an Internet Service Provider (ISP) to which the user subscribes.

5. The Internet Portal of claim 1 further comprising a search function adapted to search selected ones of listed destinations for defined search criteria.

6. The Internet Portal of claim 1 wherein, after a user invokes a destination, during navigation time to the invoked destination, the Portal software accesses and displays one or more informative displays to the user.

7. The Internet Portal of claim 6 wherein the informative displays comprise one or more advertisements.

8. The Internet Portal of claim 1 wherein the Portal software, interacting with a logged-on user, upon the user creating a new account at a WEB site and providing a pre-determined signal, automatically adds the new destination for the user's Portal page.

9. The Internet Portal of claim 1 wherein the Portal periodically summarizes account information for accounts at destinations listed on the user's WEB page.

10. The Internet Portal of claim 9 wherein the summarization is automatic in period and scope, subject to edit by the user.

11. An Internet portal, comprising:
an Internet-connected server; and
a portal software executing on the server;
wherein the portal interacts with a browser plug-in executing on a user's Internet-connected appliance, such that, when the user invokes a destination requiring a secure log-on at the destination, the portal software cooperates with the browser plug-in to furnish the data necessary for a successful log-on transparent to the user.

12. The Internet Portal of claim 11 wherein required log-on information includes a password, and wherein the password is passed on to the destination for log-on.

13. The Internet Portal of claim 11 wherein, after a user invokes a destination, during navigation time to the invoked destination, the Portal software cooperates with the user's browser plug-in to access and display one or more informative displays to the user.

14. The Internet Portal of claim 13 wherein the informative displays comprise one or more advertisements.

15. The Internet Portal of claim 11 wherein the Portal software, upon the user creating a new account at a WEB site, automatically adds the new destination for the user's Portal page.

16. The Internet Portal of claim 11 wherein the Portal periodically summarizes account information for accounts at destinations listed on the user's WEB page.

17. The Internet Portal of claim 16 wherein the summarization is automatic in period and scope, subject to edit by the user.

18. An Internet Portal software application operating on a computer processor on an Internet-connected server providing services to users communicating on the Internet, comprising:
 a log-on portion providing an interactive display for users to enter log-on information from an Internet-connected appliance for access to the Portal application; and
 a plurality of displayable stored personal pages associated each with one or more specific users;
 wherein individual personalized pages, rendered in an interactive display, list plural Internet destinations, the destinations pre-selected by the associated users, and upon invocation of a destination by the associated user, the portal software invokes a URL for the destination, and upon connection with the destination, transparently provides any required log-on information for user access at the destination.

19. The Internet Portal application of claim 18 wherein required log-on information includes a password passed on to the destination for log-on.

20. The Internet Portal application of claim 18 wherein, after transparent log-on to an invoked destination, the page at the destination is conveyed to and displayed for the user.

21. The Internet Portal application of claim 18 adapted to execute on a server hosted by an Internet Service Provider (ISP) to which the users subscribe.

22. The Internet Portal application of claim 18 further comprising a search function adapted to search selected ones of listed destinations in user's pages for defined search criteria.

23. The Internet Portal application of claim 18 wherein, after a user invokes a destination, during navigation time to the invoked destination, the Portal software accesses and displays one or more informative displays to the user.

24. The Internet Portal application of claim 23 wherein the informative displays comprise one or more advertisements.

25. The internet Portal application of claim 18 wherein, upon the user creating a new account at a WEB site automatically adds the new destination for the user's Portal page.

26. The Internet Portal application of claim 18 wherein the Portal periodically summarizes account information for accounts at destinations listed on the user's WEB page.

27. The Internet Portal application of claim 26 wherein the summarization is automatic in period and scope, subject to edit by the user.

28. An Internet Portal software application executing on an Internet-connected server, comprising:
 a log-on portion providing an interactive display for users to enter log-on information for access to the Portal application; and
 a plurality of displayable stored personal pages associated each with one or more specific users;
 wherein the portal application interacts with a browser plug-in executing on a subscriber's Internet-connected appliance, such that when the user invokes a destination the portal software cooperates with the browser plug-in to furnish the data necessary for a successful log-on transparent to the user.

29. The Internet Portal application of claim 28 wherein required log-on information includes a password passed on to the destination for log-on.

30. The Internet Portal application of claim 28 adapted to execute on a server hosted by an Internet Service Provider (ISP) to which the users subscribe.

31. The Internet Portal application of claim 28 wherein, after a user invokes a destination, during navigation time to the invoked destination, the Portal software, in cooperation with the browser plug-in, accesses and displays one or more informative displays to the user.

32. The Internet Portal application of claim 31 wherein the informative displays comprise one or more advertisements.

33. The Internet Portal application of claim 28 wherein the Portal application, upon the user creating a new account at a WEB site automatically adds the new destination for the user's Portal page.

34. The Internet Portal application of claim 28 wherein the Portal periodically summarizes account information for accounts at destinations listed on the user's WEB page.

35. The Internet Portal of claim 34 wherein the summarization is automatic in period and scope, subject to edit by the user.

36. A method for accessing and interacting with WEB pages on the Internet, comprising steps of:
 (a) using an Internet-capable appliance, logging on to a Portal server, which returns a personalized page for the user logging on, the personalized page having listed plural Internet destinations, the destinations pre-selected by the user;
 (b) selecting a destination in the personalized page, thereby invoking a URL for the destination, and, upon connection to the destination, automatically providing user log-on information for the user; and
 (c) interacting with the page automatically provided.

37. The method of claim 36 wherein the Portal server is hosted by an Internet Service Provider (ISP).

38. The method of claim 36 further comprising a step for invoking a search function adapted to search selected ones of listed destinations for defined search criteria.

39. A method for accessing and interacting with WEB pages on the Internet, comprising steps of:
 (a) using an Internet-capable appliance, logging on to a Portal server as a subscriber, the portal server storing data associated with Internet destinations pre-selected by the subscriber;
 (a) using a browser executing on the Internet-capable appliance, invoking an Internet destination;
 (b) upon being presented with a log-in interface at the destination, furnishing necessary log-in data by the Portal server, and accomplishing secure log-in for the subscriber substantially transparently to the subscriber.

* * * * *